United States Patent [19]

Powondra

[11] Patent Number: 4,560,305
[45] Date of Patent: Dec. 24, 1985

[54] YIELDABLE CONNECTION

[76] Inventor: Franz Powondra, Beethovengasse 4, A-1090 Vienna, Austria

[21] Appl. No.: 560,552

[22] Filed: Dec. 12, 1983

[30] Foreign Application Priority Data

Dec. 13, 1982 [AT] Austria ................................ 4523/82

[51] Int. Cl.$^4$ ............................................. E21D 20/00
[52] U.S. Cl. .................... 405/259; 403/362; 403/DIG. 8; 405/260; 411/411
[58] Field of Search ............... 405/259; 403/362, 355, 403/DIG. 8, DIG. 6, 109; 411/411

[56] References Cited

U.S. PATENT DOCUMENTS

| 349,005 | 9/1886 | Sargent | 403/362 |
| 1,244,848 | 10/1917 | Gadke | 403/DIG. 8 |
| 1,447,253 | 6/1923 | La Fon | 403/362 X |
| 2,355,900 | 8/1944 | Beede | 403/362 X |
| 2,719,025 | 9/1955 | Stone | 403/362 X |
| 4,020,929 | 5/1977 | Goldin | 403/362 X |

FOREIGN PATENT DOCUMENTS

| 2409658 | 2/1974 | Fed. Rep. of Germany . | |
| 2629351 | 9/1977 | Fed. Rep. of Germany . | |
| 628622 | 11/1961 | Italy | 405/259 |
| Q49787686 | 12/1980 | U.S.S.R. . | |
| 826000 | 4/1981 | U.S.S.R. | 405/259 |

Primary Examiner—Dennis L. Taylor
Attorney, Agent, or Firm—Fleit, Jacobson, Cohn & Price

[57] ABSTRACT

The invention provides a yieldable connection between a metallic rod-shaped body and a holding means through which it passes and is intended particularly for yieldable rock bolts (roof bolts) anchor bolts and yieldable props, e.g. for mining and tunnelling. For that purpose shear bodies, e.g. spheres or inclined cylindrical pins are provided between the holding means and the slidable rod-shaped body and project some distance into the cross-section of the rod-shaped body. On sliding of the latter, in the holding means, these shear bodies form grooves in the rod, whereby energy is absorbed.

10 Claims, 8 Drawing Figures

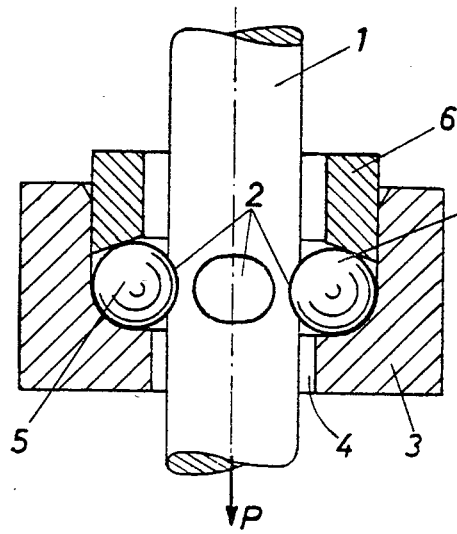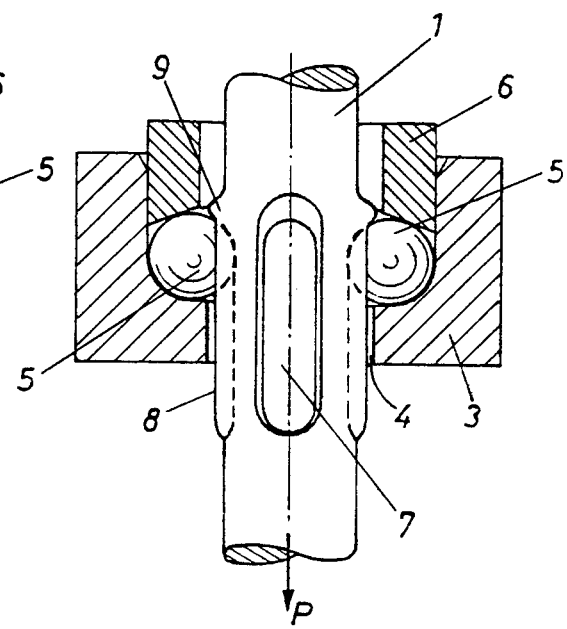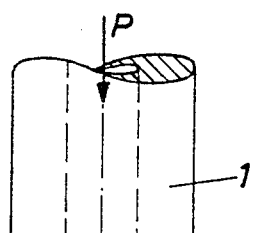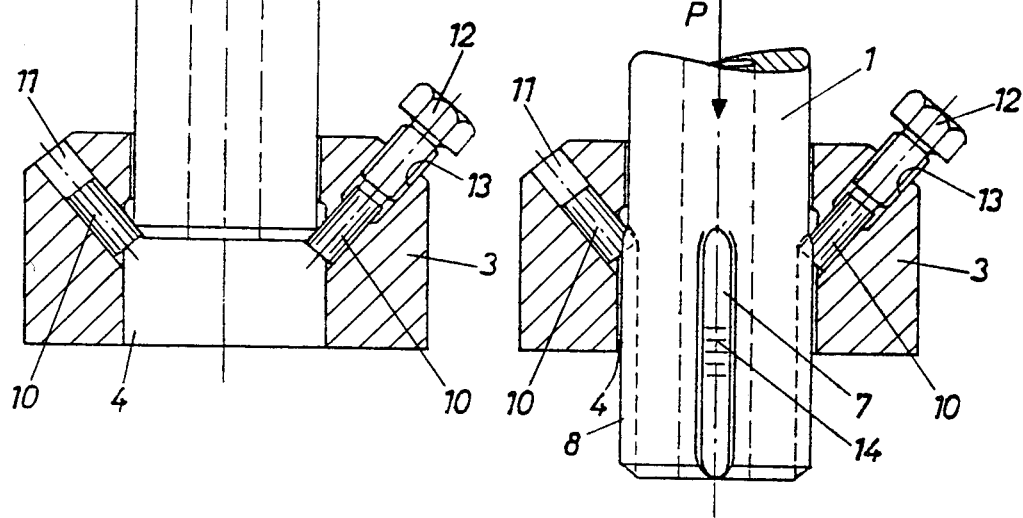

YIELDABLE CONNECTION

BACKGROUND OF THE INVENTION

The invention relates to a process for attaining a yieldable connection between a metallic rod-shaped body and a holding means through which it passes including bodies guided therein and projecting into its open cross-section.

In many cases it is desirable for load bearing constructions to have high yieldability whilst retaining their load-bearing ability. Thus, in tunelling, earth-moving and mining, load bearing constructions are desired which can partake in the deformations of the overburden and of earth masses without breakage. Rock bolts, for example, are so designed that the overburden bears onto yieldable constructions. The desired yieldability may for example be attained by a connecting member on the anchoring rod which slides along the latter due to the load of the overburden or, e.g. in that between the overburden and a fixed point, along the anchor, a crushing body is provided. Such anchors may be relaxed or pretensioned.

In tunnelling and mining tubbing constructions of steel or steel reinforced concrete have been moreover proposed which in order to increase the deformability of the roof support, comprise crushing zones between the tubbings. Whenever the overburden moves towards the cavity, the crushing zones between the tubbings are compressed. Other roof support means such as arches, props and the like may also be equipped with crushing constructions in order to retain the supporting action even in the event of overburden deformations.

The aforesaid yieldable constructions are employed in mining and tunnelling also as a safeguard against rock falls and rock bursts. The kinetic energy of the rock falls or rock bursts being rendered harmless by being absorbed by the deformation energy of the yieldable construction.

The same purpose - the conversion of kinetic energy into deformation energy - is served by yieldable constructions in traffic engineering, e.g. in the form of yieldable retaining means for persons in vehicles, crushing zones in vehicles or in the form of catching constructions for vehicles, e.g. retention railings, retention nets and buffer blocks having predetermined yieldabilities. Similar yieldable constructions are employed as protection against avalanches, rock falls and other falling or flying objects.

For obtaining the desired yieldability, anchor heads have become known in the case of anchors which can slide along an anchor rod when subjected to the load of the over burden when subjected to rock pressure.

This may be attained by an anchor head designed as a drawing die. In the event of sliding between the anchor rod and the anchor head, the anchor rod is drawn through the anchor head designed as a drawing die; the anchor rod is thereby subjected to a reduction in cross-section. In this context a number of different constructions are possible. For example, anchors comprising an anchor rod composed of a comparatively thin rod member onto which the anchor head in the form of a drawing die has been pushed and a relatively thicker rod member which on sliding of the anchor head along the anchor rod suffers a reduction in cross-section. The thicker rod member can also be in the form of a threaded rod, such that the thread, as the rod is drawn through the drawing die, is stripped.

In the case of anchors it is also known to have anchor heads which are slidable on the anchor rod, in which the anchor rod and the anchor head are interengaging bodies between which a space of tapering configuration is provided. This is filled with a particulate material which is subjected to pressure in the direction of taper of the space. If the anchor rod is moved in relation to the anchor head in the direction of taper of the space, the particulate filling material, e.g. spheres, is pressed into the material of the anchor rod or of the anchor head and of the anchor rod. Sliding is therefore possible only with force. The described construction comprising an anchor head and rod represents a forced transmission device in which forces are transmitted preferentially in the longitudinal direction of the rod, deformation work being exercised during the sliding movement between the anchor head and the rod.

From DE-OS No. 2 511 706 a yielding anchor is known which comprises a tube anchored in a drilled hole in which tube the anchor rod slides when a force is exercised. The transfer of forces between the rod and the tube proceeds by way of a bolt which is mounted vertically to the axis of the rod on the borehole side of the anchor rod end. These bolts engage into a lining adhering to the tube interior and cause the lining to be stripped in the event of the anchor rod sliding in the tube.

Yieldable connections are subjected to requirements which depend on their intended use. The object here desired is a yieldable connection having the following characterstics: It should be able to transmit high forces, e.g. 1 000 kN, even over major sliding distances of e.g. 30 cm, is to attain a full load bearing ability even after a short sliding distance and to retain this load bearing ability following further displacement. It is to be applicable to ribbed or smooth solid or hollow rods and is to be suitable for rods which are either subjected to traction or to compression. In spite of small dimensions it is to be able to transmit high forces, must be robust and as little as possible affected by external factors such as temperature, moisture or dirt. Moreover, it is to be of simple construction and should be capable of being manufactured as economically as possible.

The known constructions attain these objects only partly, or inadequately.

The aforementioned anchors, in which a yieldability is attained in that the anchor rod under load is drawn through an anchor head designed as a drawing die, require anchor rods which, because of their special configuration, and high degree of dimensional accuracy, are expensive. Moreover these constructions are virtually only suitable for rods subjected to tensile forces.

The aforementioned yieldable anchors which comprise an inner lining in a tube anchored in a borehole, and which lining on sliding of the anchor rod in the tube is stripped by bolt formations, are expensive in design and of very limited load-bearing ability.

The aforedescribed anchor heads in which the forces acting onto the anchor rods are transmitted by way of a particulate filling material, and which can be mounted on non-machined ribbed anchor rods, do not meet the requirements because they attain their full load-bearing ability after only a short sliding movement.

BRIEF DESCRIPTION OF THE INVENTION

It is an object of the invention to avoid the aforesaid drawbacks and to provide yieldable connections by a new process in order to attain the objectives.

This object has been attained in that in a process of the type defined in the introduction, and according to the invention, the bodies are fixed shear bodies which project into the cross-section of the rod-shaped body and which, on sliding of the latter in the holding means form grooves in the rod.

Also in accordance with the invention there is provided an apparatus for carrying out the process in which according to the invention, a rod shaped body comprises at least in one position a counter member for a shear body, a holding means through which the rod-shaped body passes being provided with a support for the shear body. Further features of the invention will be described in the following with reference to the drawings.

BRIEF DESCRIPTION OF THE DRAWINGS

FIG. 1 illustrates an embodiment comprising a rod subjected to tensile loading and a pot-shaped holding means with spheres serving as shearing bodies, more particularly prior to the rod-shaped body having been displaced in the holding means, and FIG. 2 shows the same embodiment, however, after the rod has been moved in the holding means;

FIGS. 3 and 4 illustrate an embodiment comprising a tubular rod subjected to compressive forces, rollers serving as shearing bodies and an annular holding means, once again, prior to and after the commencement of displacement respectively.

DESCRIPTION OF SPECIFIC EMBODIMENTS

Figure 5:
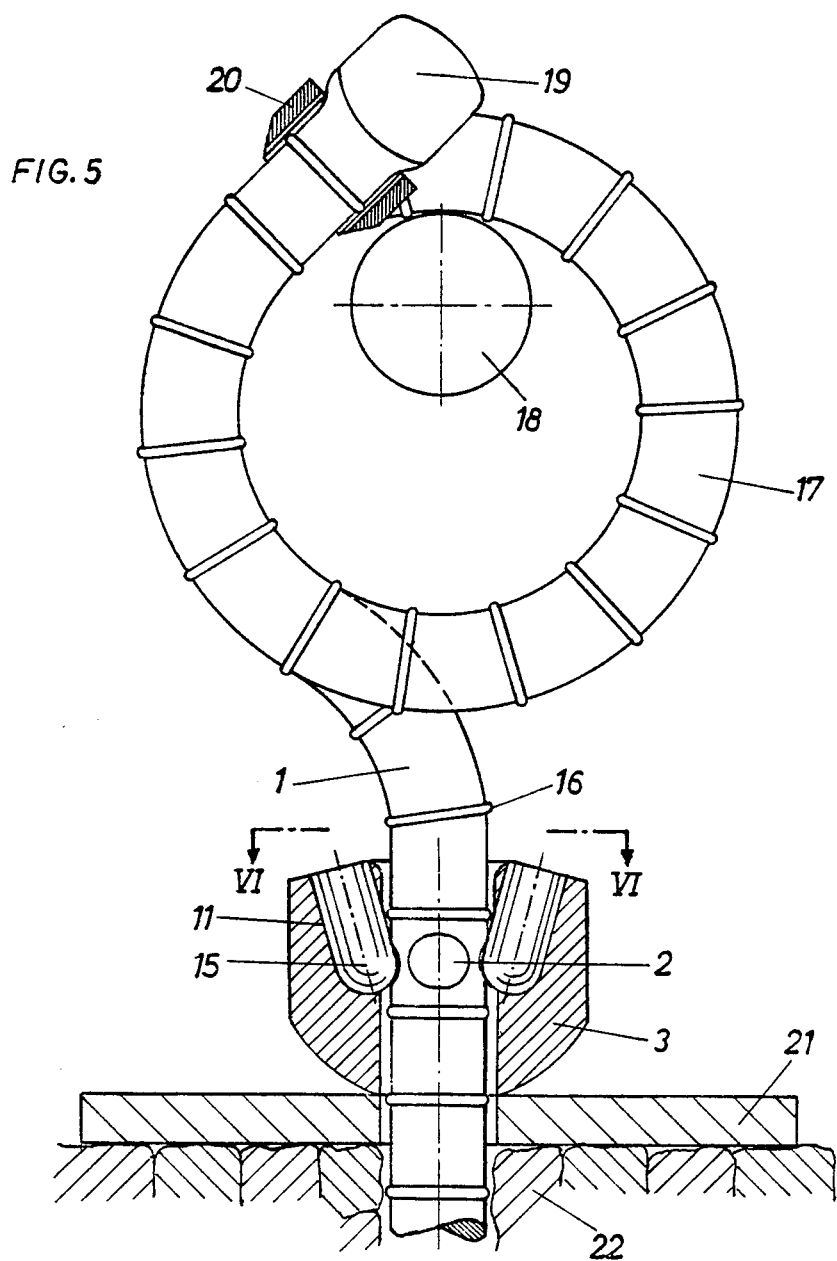
FIG. 5 illustrates an embodiment comprising a ribbed anchor rod with a curled end and an anchor head with bolt-shaped shear bodies.

According to FIG. 1 the rod-shaped body, e.g. an anchor rod of steel subjectable to tensile load for mining and tunnelling or for avalanche protection, is denoted as 1. The holding means 3, illustrated in section has essentially a pot-shaped configuration and is provided with a bore 4 for the passage therethrough of the rod-shaped body 1. In this example spheres 5, e.g. of hardened steel, are provided to serve as shearing bodies, accommodated in the interior of the holding means 3 and supported against the bottom of the interior of the holding means 3. The rod-shaped bodies find support against the spheres 5 in the recesses 2. If necessary, the stopper 6 closes the interior of the holding means 3 and holds the spheres in position inside the holding means 3.

The stopper 6, in FIG. 1, which is press-fitted into the holding means 3 and pressed onto the spheres 5 serves the purpose of holding the spheres 5 in position. The same task may be performed in different manners which, in the following, are described by way of example. Thus the holding means 3 may for example be provided with recesses for each individual sphere 5, such that the spheres 5 adopt a predetermined position. Alternatively, the spheres can be mounted in a ball run or be fixed in position by spacer members. It is also possible to place the spheres in the holder means 3 so closely together that they form a closed ring of spheres.

The holding means 3 which essentially serves to offer a support to the spheres 5, may be designed in various manners depending on its purpose.

The recesses 2 illustrated in FIG. 1 by way of which the rod 1 finds support by way of the spheres at the beginning of loading, may be provided by milling, grinding, turning or pressing and may also have a shape different from that shown in FIG. 1. However, in the case of a rod 1 as illustrated in FIG. 1, and which is to be subjected to tensile forces, it may be advantageous in many cases for preserving the load bearing ability of the rod 1 to form the recesses in the rod by the application of lateral forces, without pre-heating the rod. The cold deformation of the steel material during pressing retains the load bearing properties of the rod in spite of a cross-sectional reduction in the region of the recesses, or at least does not cause a substantial reduction thereof.

When the rod is loaded in the direction of the arrow P this rod 1 commences displacement in relation to the holder means 3, causing the spheres 5 to be forced into the material of the rod 1.

The resistance against sliding of the rod 1 increases substantially in that as illustrated in FIG. 2 the spheres, to an increasing extent, cause lateral displacement and advanced displacement of the steel material - lateral bead formations 8 and a kind of "bow wave" 9 are formed. The full load bearing ability is attained and will be retained during further displacement, once the lateral bead 8 and the "bow-wave" 9 no longer grow and have attained constant dimensions. In the process, the spheres form uniform grooves 7 into the steel material of the rod 1. In order not to interfere with the formation of lateral beads 8, the bore 4 has a larger diameter than that of the rod 1.

The intended property of the connection to maintain the full load bearing ability which is attained after a short displacement along the rod 1 even in the event of long displacements—e.g. 30 cm is attained only if the spheres 5 form grooves 7 in the rod 1 of maximum uniformity. The formation of such grooves depends particularly on the material of the rod 1, the diameter of the spheres 5 and the depth of penetration of spheres 5 into the material of rod 1. It is a precondition that the spheres 5 have an appropriate strength and hardness so that they will not wear down or break and that the retaining means 3 are able to absorb the forces which arise. In order for uniform grooves 7 to be formed in the rod 1, the depth of penetration of spheres 5 must not exceed a certain limit, the permitted depth of penetration increasing as the size of the spheres increases.

If the depth of penetration, in particular in the case of soft steels, is too large, the spheres, as displacement progresses in the connection, will push in advance thereof, increasing amounts of material; the bow-wave ahead of the spheres continuously increases in size and does not stabilize. Accordingly, as the displacement progresses, the resistance increases progressively until eventually fractures occur in the connection.

Brittle steels for the rod exhibit a different performance. The bow-waves in advance of the spheres are formed only in part because of steel material in the region of the bow-wave being splintered off the rod continuously.

In order to attain uniform grooves of greater depth with rods of softer steel and resulting higher transmission of forces, a design is illustrated in FIG. 3 in which bow-waves as result with spheres as in FIG. 2 are avoided. In the case of FIG. 3 rollers 10 are used as shearing bodies instead of spheres, and their axes are inclined to the axis of the rod. Rollers so arranged, when the rod 1 is displaced in relation to the holder means 3, form grooves in the rod 1 by virtue of their in particular laterally displacing rod material whilst bow-waves are formed only to a minor extent as apparent from FIG. 4.

FIGS. 3 and 4 illustrate two conditions of a yieldable connection comprising a heavy walled, pressure loaded tube (arrow P) serving as the rod-shaped body 1. Such yieldable connections may for example be provided as crushing members between individual components of a construction under compressive load, in order to increase the yieldability thereof or for example, in the case of pretensioning anchorsfor a slope where creep hazards prevail. In that case the crunching member is provided between the slope to be supported and the pretensioning head of the anchor, the pretensioning anchor rod passing therethrough.

FIG. 3 illustrates a condition of the yieldable connection in which no displacement of the rod-shaped body 1 in the holding means has taken place yet, whilst FIG. 4 represents a condition after the rod-shaped body 1 has already been displaced in the holding means 3 in accordance with the direction of loading P, resulting in the formation of groove 7 with lateral beadings 8 in the rod 1 due to the rollers. The bore 4 is selected of such magnitude that the beadings 8 can form freely. The holding means 3 takes the form of a ring. It comprises e.g. four cylindrical passages 11 inclined each in a uniform orientation in relation to the axis of the holding means and each accommodating a roller 10—the shearing body.

The rollers 10 are preferably composed of steel hardened throughout such as are also used for roller bearings. The depth of the passages 11 predetermine the extent to which the rollers 10 penetrate into the cross-section of the rod 1. The diameter of the passages 11 and of the rollers 10 is so selected that the rollers become firmly embedded in the passages 11 and thus cannot drop out of the holder means 3. If a particularly reliable correct positioning is desired for the shearing bodies it is possible to provide pressure screws 12 acting directly onto the rollers 10. The passages 11 for that purpose are provided at the outermost ends with threads 13 (see FIGS. 3 and 4, right-hand portion).

However, it is also possible to provide the rollers themselves with external threads and to screw these into the threaded passages. This not only provides complete protection against the dropping out of the rollers, but the depth of penetration of the rollers into the body 1 (or into its recesses respectively) can be adjusted in advance.

Further possibilities to fix the rollers 10 in the passages 11 may, for example, comprise the feature of locally so deforming the passages 11 prior to or after the introduction of the rollers 10 into the passages 11, that a force has to be applied in order to be able to push the rollers 10 out. The rollers may also be provided with an annular groove for accommodating a ring which becomes squashed when the roller 15 is inserted into the passage 11. The holder means 3 may also be provided with a cover not shown which closes the passages 11 at least partly and retains the roller 10 in the desired position.

When using rollers as shearing bodies, the bow-waves arising when spheres are used, are avoided. However, in the event of major depth of penetration of the rollers 10 into the rod 1, transverse cracks 14 are created in the grooves 7 which result in a non-uniform load bearing performance of the connection. In order to avoid this it is advantageous to round off the roller-shaped shearing bodies at that end which extends into the material of the rod 1. The shearing bodies will then, as illustrated e.g. in FIG. 5, have the configuration of a bolt 15 comprising a cylinder and a hemisphere of the same diameter. Such a configuration of the shearing body is for example particularly suitable for ribbed rods.

FIG. 5 represents an anchor—for example for protecting cavities in mining and tunnelling—the rod-shaped body 1 of which is composed of a steel rod, provided with ribs 16 for better fixation in the rock and the projecting portion 17 on the atmospheric side being coiled such that the anchor will project to a lesser extent into the cavity. If the rock layer surrounding the cavity move into the cavity, the anchor, the rock-engaging end of which is firmly anchored in stable rock layers, must increase in length in order not to fracture. This is made possible by the unrolling of the initially coiled projecting portion on the atmospheric side. Such a construction is particularly suitable for major rock deformations.

A roller 18 onto which the coiled projection portion 17 finds support during unrolling, may be provided in order to allow the uncoiling process of the projecting portion 17 of the rod 1 on the atmospheric side to proceed in a predetermined manner, the projecting portion 17 during the uncoiling process finding support on the roller 18. The roller 18 in turn is supported by way of struts, which are not illustrated in FIG. 5 against the mounting means 3.

A coiled up projection 17 will be provided advantageously only if major rock deformations and thus major displacements of the rod 1 in the holding means 3 are to be expected and a major overhang of the rod 1 would be objectionable. In other cases the projecting rod member will only be bent over or is left straight. Wherever a risk of injury results from the projecting rod this may be covered with a soft material, e.g. foam plastic.

The tensile forces due to which the rod is displaced in the holding means 3 may be determined by the constructional design of the connection, e.g. by the depth of penetration of the bolt 15 into the rod 1 or, respectively, the number of bolts 15. In order to avoid fractures of the rod 1 when sliding in the holding means 3, the steel material of the rod 1 is appropriately utilised to only about its stretching limit, such that a plastic deformation ability of the rod is retained until it fails. In order to utilise this plastic deformation ability of the rod and also its full load bearing capacity, the rod 1 is provided with an end stop member 19 and 20 by way of which the rod 1 after its displacement in the holder means 3 supports itself against the bolt 15 or the holder means 3 in accordance with the projecting region of the rod. In the case of the end stop member illustrated in FIG. 5, the rod end 19 was squashed in a direction normal to the rod axis, causing spreading of the rod-end, a crushing ring 20 being provided in order to increase the transmission of force. A further possibility of providing a terminal stop member comprises, for example, squashing the end of the rod in cold or warm conditions.

Figure 6:
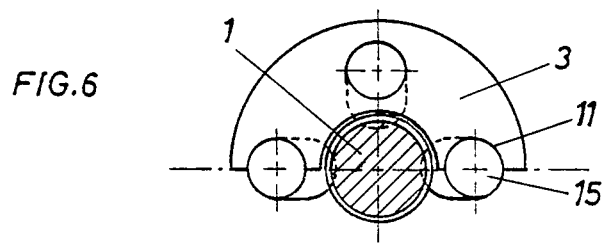
FIG. 6 shows the anchor head along the section VI—VI of FIG. 5.

The holding means 3 illustrated in FIG. 5 in section and in FIG. 6 in plan view is provided with passages 11 as shown in FIGS. 3 and 4, rounded at their ends according to the configuration of the bolts as illustrated in FIGS. 3 and 4. The rod 1 comprises pressed-in recesses 2 into which the bolts 15 penetrate. The holding means 3 is supported against the rock 22 by way of the anchor plate 21.

In the following the more important differences and advantages of the present yieldable connection will be discussed in comparison with the drawing die designs of known anchors. When an anchor rod is drawn through a drawing die, the diameter of the rod is reduced. The cross-sectional reduction takes place over the entire circumferential line of the anchor rod; a smooth rod of relatively small diameter is formed. On the other hand, in the event of the present invention, the shearing bodies penetrate only in isolated regions of the rod circumference into the rod material, and displacement of the rod in the connection results in the formation of grooves in the rod. In contrast to drawing dies, the shearing bodies displace the steel material predominantly laterally.

Accordingly, as compared with a drawing die, the present inventipn offers substantial advantages in the case of yieldable connections: the connection according to the invention is as suitable for yieldable connections under tensile load as for yieldable connections under compressive load, whereas a drawing die connection is substantially suitable only for tensile forces.

In the event of the drawing die connection, the entire inner periphery of the nozzle must be wear-resistant, whereas in the case of the connection according to the present invention, this is necessary only for the individual shear bodies, and these in turn need only have simple geometrical configurations.

The present connection causes simplification of the overall design of a yieldable anchor and respectively a substantial avoidance of weakening of the anchor rod. Whereas an anchor fitted with a drawing die connection comprising an undivided drawing ring is drawn over an anchor rod comprising a relatively thin rod member onto which the drawing die has been pushed and must comprise a thicker rod member which suffers cross-sectional reduction in the drawing die. The anchor rod in the case of the present connection may be of uniform cross-section provided only locally with e.g. pressed-in recesses for the accommodation of the shearing bodies.

In the event of the drawing die connection comprising a divided drawing ring, the rod in one position must be provided with a peripheral annular groove passing around a rod for accommodating the two drawing ring half shells, whereas with the present connection, only a few depressions must be provided in the rod.

The extent of transfer of forces in the case of the present invention is predetermined for a given anchor rod by the shape and the number of the shear bodies and their depth of penetration into the rod material, whilst in the case of a drawing nozzle construction, it may be determined by the degree of cross-sectional reduction of the rod. For given requirements in respect of the load bearing ability of the connection, the manufacturing tolerances in the case of the present invention, applying to the connection members, may be greater. In addition adaptations of the load bearing properties may readily be attained in the connection, e.g. by the selection of an appropriate number of shearing bodies.

Figure 7:
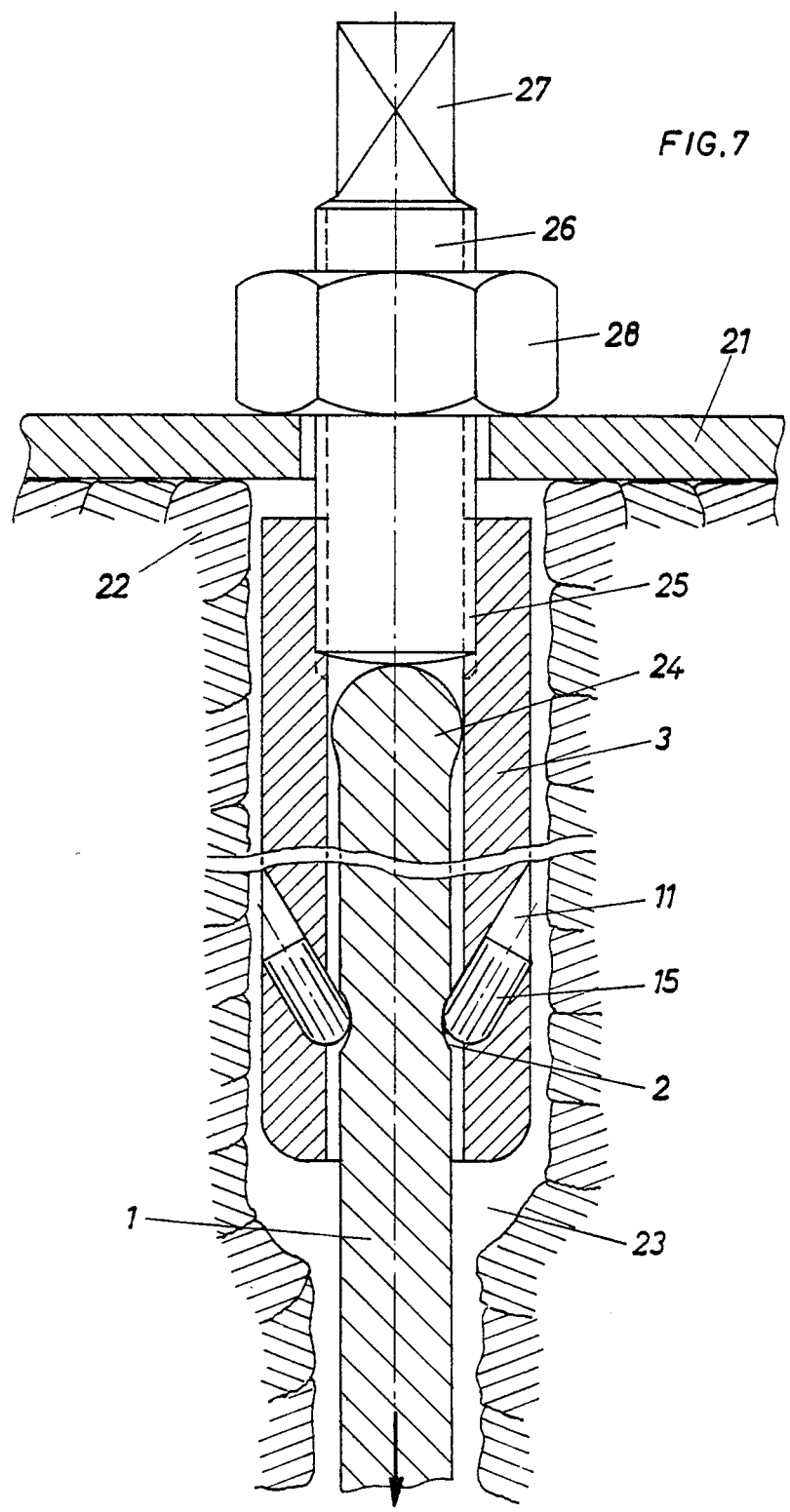
FIG. 7 shows an embodiment in which the holding means is tubular.

FIG. 7 shows in longitudinal section an extendable traction member exemplified by an anchor fitted inside a borehole. The rod-shaped body 1—the traction anchor—is accommodated in a borehole 23 which towards the borehole entrance has an increased diameter. The holder means 3 takes the form of a thick-walled tube. A plurality of passages 11 inclined to the longitudinal axis of the tube is provided in the tube periphery, accommodating the bolt 15 serving as shear bodies. These bolts 15 project into the recesses 2 pressed into the rod 1 which, at the rod end, directed towards the opening of the borehole, comprises an end stop member 24 in the form of a squashed region. That end of the holder means 3 which, in FIG. 7, is uppermost, comprises an inner thread 25 and accommodates a connecting bolt 26 comprising a square end 27. The latter, during assembly, is screwed in so far as to press against the squashed end 24 of the traction anchor, whereby the bolt 15 is retained firmly in position, being secured against popping out of the passages 11; the connection between the connecting bolt 26, an anchor plate 21 and the rock 22 is brought about by a nut 28.

The extendable traction member illustrated in FIG. 7 is suitable also with little modification for yieldable bracing constructions.

Figure 8:
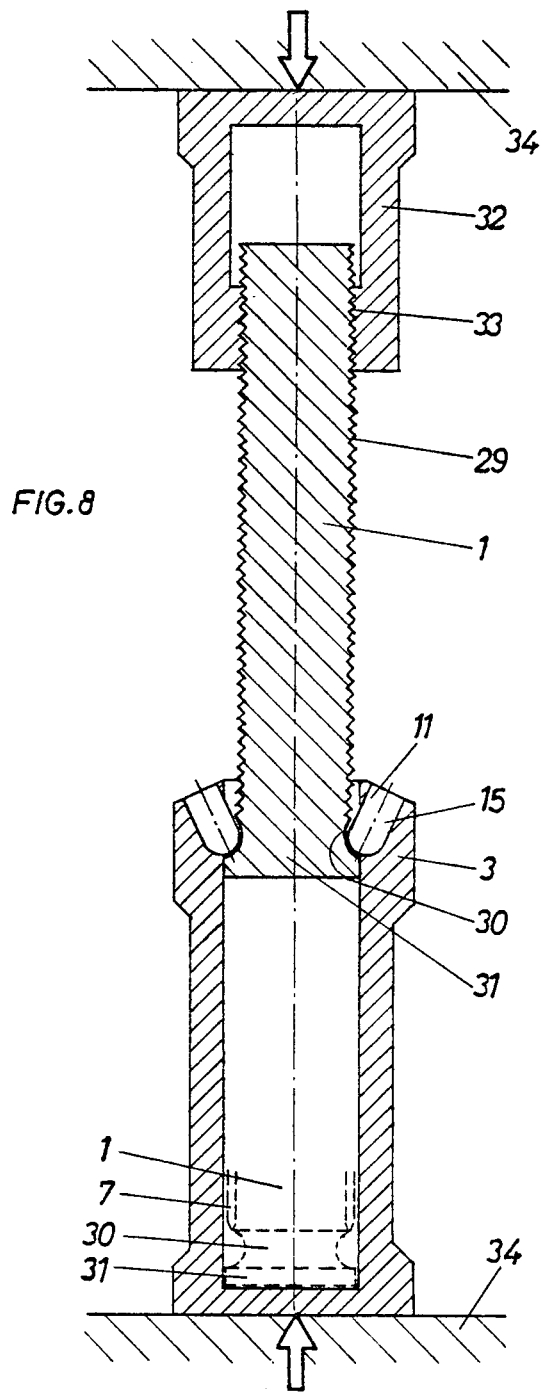
FIG. 8 shows an embodiment adapted as a prop in which the rod-shaped body comprises a thread. The embodiments illustrated in FIGS. 6, 7 and 8 are illustrated in a condition in which the rod has not yet moved in relation to the holding means.

FIG. 8 illustrates in longitudinal section a trough comprising a tensioning device. The rod 1 comprises a thread 29, peripheral groove 30 into which bolt-shaped shear bodies 15 project and a guide 31. The holding means 3 is tubular and comprises passages 11 for accommodating bolts 15. By turning the prop device 32 which by way of its inner thread is screwed on to the rod 1, or respectively by turning the rod 1 the prop can be tensioned against the bearing surfaces 34. In FIG. 8 the prop is illustrated in a condition in which the rod 1 has not yet been pressed into the holder means 3. The portion of the displaced rod 1, illustrated in broken lines, illustrates the extent to which the rod 1 can be pressed into the holder means under pressure. In the course thereof the bolts 15 form grooves 7 in the rod 1.

The props illustrated in FIG. 8 may be used in a known manner, e.g. in mining for supporting the hanging walls. In a modified form the prop is also suitable as supporting lens or as yieldable connections when forming false work for arches or when supporting arches. For that purpose the tensioning device 31 may serve as an assembly aid. A further mode of application is provided for example in the context of concrete or steel ring shields for cavities in tunnelling and mining. In that case the props would be installed between individual ring members to serve as tensionable crushing members, in order to provide for a yieldability of the annular shield. A further mode of use is provided for example by the installation of the props in building work where there is a risk of settling, e.g. in settling mining areas, e.g. between the building pillars and the building foundations, in order to avoid overloading of individual parts of the load bearing structure of the building even in the event of uneven settling.

In the aforegoing, the possibilities of using the present process for the attainment of yieldable connections, were described merely by way of example. The design as well of the rod 1, the holding means 3 and in particular of the shearing bodies was dealt with only by way of example. The description of the shearing bodies was limited to simple geometric configurations such as spheres, rollers and bolts. Shearing bodies of different configuration which perform their function during a displacement of the rod 1 in the holder means 3 of creating grooves 7 in the rod 1, are also conceivable.

The claims which follow are to be considered an integral part of the present disclosure. The reference numbers in brackets contained in the claims refer to the drawings and serve to facilitate the understanding of the claims but are not intended at all to restrict the claims to any features as specifically illustrated in the drawings.

I claim:

1. Process for attaining a yieldable connection between a metallic rod-shaped body and a holding means through which it passes, which comprises: forming recesses in the periphery of the rod-shaped body; fitting between the rod-shaped body and the holding means shear bodies which project into the recesses in the rod-shaped body; and causing relative longitudinal movement between the holding means and the rod-shaped body which on sliding of the latter in the holding means form grooves in the rod-shaped body.

2. Apparatus for providing a yieldable connection, said apparatus comprising: a rod-shaped body having at least one peripheral recess for receiving a shear body, at least one shear body having an inner end extending into a recess in said rod-shaped body and having a hardness greater than that of said rod-shaped body and a holding means having an opening through which the rod-shaped body passes and provided with support means for supporting the shear bodies, whereby relative longitudinal movement of said rod-shaped body toward said support means of said holding means causes said shear body to form a groove in said rod-shaped body.

3. An apparatus according to claim 2, wherein the inner ends of the shear bodies have a rounded configuration which penetrates into the rod-shaped body.

4. An apparatus according to claim 2, wherein the shear bodies, are bolts their axes being inclined obliquely to the axis of the rod.

5. An apparatus according to claim 2, wherein the holding means is of essentially annular configuration and comprises at least one recess for supporting the shear bodies.

6. An apparatus according to claim 2, wherein the rod-shaped body includes raised surface regions.

7. An apparatus according to claim 2, wherein the rod-shaped body is of tubular configuration.

8. An apparatus according to claim 2, in the form of an anchor, the rod-shaped body of which includes an outwardly projecting bent-around rod region.

9. An apparatus according to claim 2, in the form of an anchor, the rod-shaped body of which includes an end stop member.

10. An apparatus according to claim 2, wherein the shear bodies are bolts, their axes being inclined obliquely to the axis of the rod and their inner ends pointed in the direction of a force that is applied to the rod-shaped body to cause relative longitudinal movement between the rod-shaped body and the holding means.

* * * * *